United States Patent
Burger et al.

(10) Patent No.: US 7,144,206 B2
(45) Date of Patent: Dec. 5, 2006

(54) ATTACHMENT ELEMENT FOR SECURING A DEPTH STOP ON A HAND-HELD POWER TOOL

(75) Inventors: Helmut Burger, Moorenweis (DE); Wolfgang Schreiber, Jengen (DE)

(73) Assignee: Hilti Aktiengesellschaft, Schaan (LI)

( * ) Notice: Subject to any disclaimer, the term of this patent is extended or adjusted under 35 U.S.C. 154(b) by 364 days.

(21) Appl. No.: 10/654,682

(22) Filed: Sep. 4, 2003

(65) Prior Publication Data

US 2004/0112182 A1   Jun. 17, 2004

(30) Foreign Application Priority Data

Sep. 5, 2002   (DE)   .................. 102 40 994

(51) Int. Cl.
B23B 45/00   (2006.01)
B23B 45/02   (2006.01)

(52) U.S. Cl. ..................... 408/14; 408/241 S
(58) Field of Classification Search ............. 408/14, 408/241 S, 241 R; 173/21, 11; 227/142; B23B 45/00
See application file for complete search history.

(56) References Cited

U.S. PATENT DOCUMENTS

| | | | | |
|---|---|---|---|---|
| 1,929,585 A | * | 10/1933 | Henry ................. | 408/113 |
| 3,550,481 A | * | 12/1970 | Jensen ................. | 408/239 R |
| 3,779,663 A | * | 12/1973 | Ruggles ................ | 408/113 |
| 5,620,209 A | * | 4/1997 | Sauer .................. | 285/23 |
| 5,690,451 A | * | 11/1997 | Thurler et al. .......... | 408/113 |

FOREIGN PATENT DOCUMENTS

| | | |
|---|---|---|
| AU | 0462955 | 5/1973 |
| DE | 3126245 | 1/1983 |
| EP | 0261386 | 3/1988 |
| JP | 59-227306 | * 12/1984 |

OTHER PUBLICATIONS

Search Report.

* cited by examiner

*Primary Examiner*—Monica Carter
*Assistant Examiner*—Sara Addisu
(74) *Attorney, Agent, or Firm*—Abelman, Frayne & Schwab

(57) ABSTRACT

An attachment element for securing a depth stop (2) of a hand-held power tool (4) includes a pin guide 5 with one or more noses (8a, 8b) for mounting the attachment element (1) on the power tool (4) and a flange attachment nose (9) axially offset with respect to the mounting nose or noses (8a, 8b) for formlockingly engaging in a respective opening(s) (10, 10a) provided on the power tool (4). The attachment element is secured on the tool with a fastening member (6).

6 Claims, 2 Drawing Sheets

ATTACHMENT ELEMENT FOR SECURING A DEPTH STOP ON A HAND-HELD POWER TOOL

BACKGROUND OF THE INVENTION

1. Field of the Invention

The present invention relates to an attachment element for securing an axially displaceable depth stop to a hand-held power tool such as, e.g., a hammer drill.

2. Description of the Prior Art

Conventionally, pin-shaped depth stops are displaceably arranged in pin guides the axes of which extend parallel to working tool axes and which are provided in the housings of hand-held tools or in additional handles connected with respective hand-held power tools. The depth stops are manually secured in respective pin guides.

German Publication DE-31 26 245 discloses securing of a depth stop of a hand-held power tool with a jaw grip provided with a wing bolt.

German Publication DE-29 18 586 discloses securing of a depth stop of a hand-held tool with an eccentric lever. According to German Publication 100 06 042, the depth stop is secured in a pin guide of a housing projection with a spring slide.

According to German Publication DE 35 09 199, the depth stop is secured in a projection frictionally and form-lockingly securable to the power tool. The radial housing or handle projection, in which a pin guide is provided, projects radially outwardly over the chuck. The depth stop extends through the pin guide parallel to the working tool axis. If the use of the depth stop is not necessary, it is removed from the pin guide. However, the housing or the handle projection which forms a part of a power tool, requires additional space for operating the power tool. Even more space is necessary if the associated securing means also remains.

Accordingly, an object of the present invention is to provide attachment means or element for securing a depth stop on a power tool without an obstructing, constantly remaining housing projection or auxiliary handle projection.

SUMMARY OF THE INVENTION

This and other objects of the present invention, which will become apparent hereinafter, are achieved by providing an attachment element including a pin guide, a fastening member, at least one nose for securing the attachment element to the power tool, and at least one flange attachment nose axially offset with respect to the at least one securing nose for formlockingly engaging in a respective opening provided on the power tool.

The securing and flange attachment noses provide for releasably securing the attachment element between the power tool housing and a mounting flange, with the securing and flange attachment noses formlockingly engaging in respective associated openings provided in the housing and the mounting flange.

The flange segmented surfaces and the openings, which are used for mounting the attachment element, permit to use the hand-held power tool in a more narrow space when the depth stop is not used as no radially projecting parts, which require an additional free space, remain.

Advantageously, the attachment element has a radial mounting surface which provides for a frictional attachment of the attachment element due to a surface contact between the attachment element and the power tool. The surface contact is insured by clamping the attachment element with a clamp band.

Advantageously, the radial mounting surface is formed as an inner cylindrical surface, which provides for a surface contact of the mounting surface with cylindrical segments of a cylindrical mounting flange.

Advantageously, the at least one securing hose is formed as an axial projection provided on a power tool side of the attachment element, providing a radial stop.

Advantageously, there is provided another nose for securing the attachment element to the power tool and which is spaced from the first securing nose. Two securing noses, which are spaced from each other by a predetermined distance, form two respective screw head holes, which are spaced from each other by the same distance, for two deep-seated screws for internally securing a cylindrical mounting flange to the power tool. Thereby, the attachment element is fixedly secured to the power tool at two points, whereby a complete matching of the attachment element with the mounting flange of the power tool is achieved.

Advantageously, the flange attachment nose is formed as a radially inwardly extending projection provided on a working tool side of the attachment element, thus, forming a axial stop.

Advantageously, the flange attachment nose has a radial undercut which permits to radially secure the attachment element with a flange clamp band forming part of an additional handle.

Advantageously, the fastening member is formed as a wing bolt that provides for manual force and/or formlocking of the depth stop in the pin guide.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
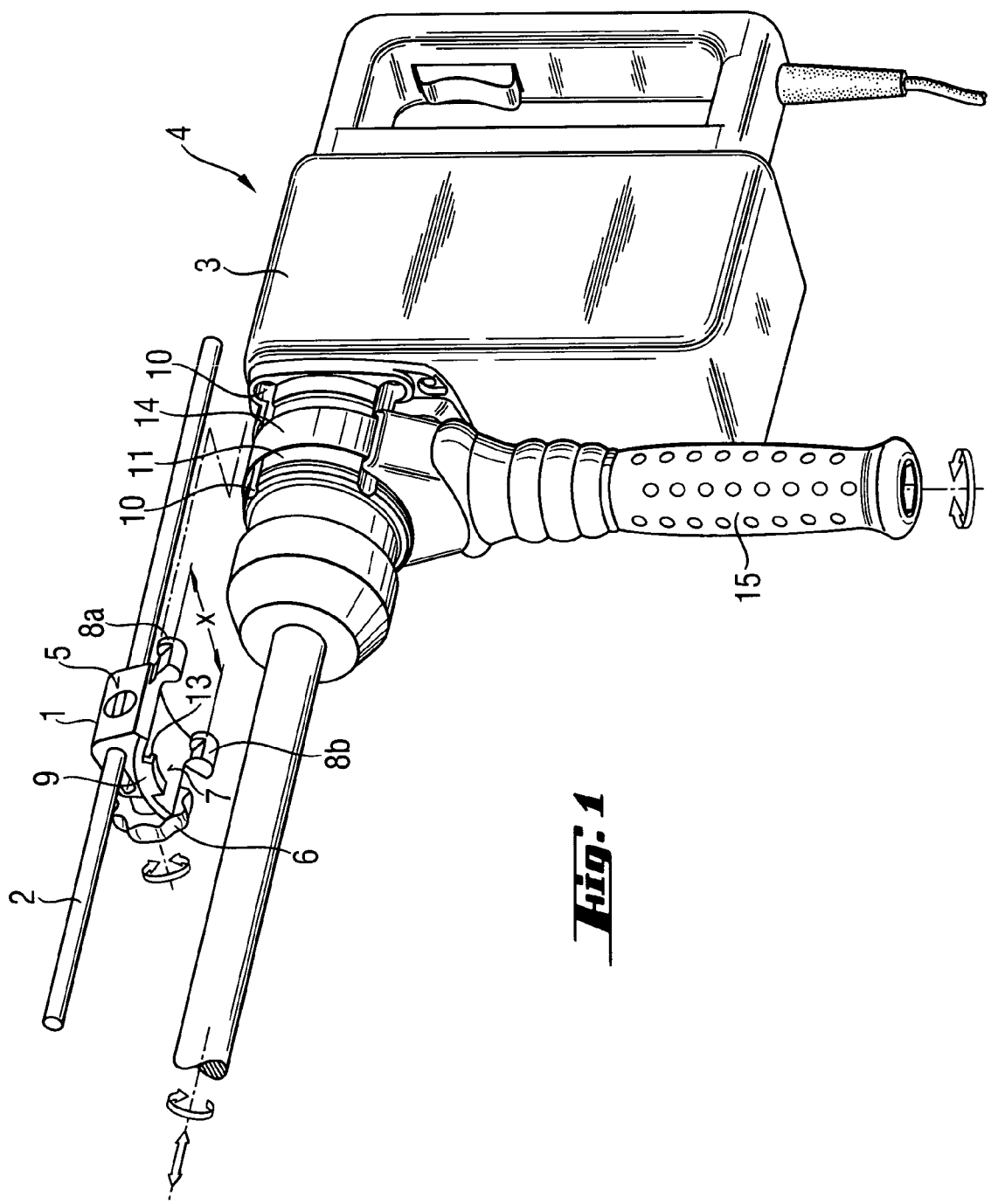
FIG. 1 a perspective, exploded view of a hand-held power tool with an attachment element according to the present invention.
Figure 2:
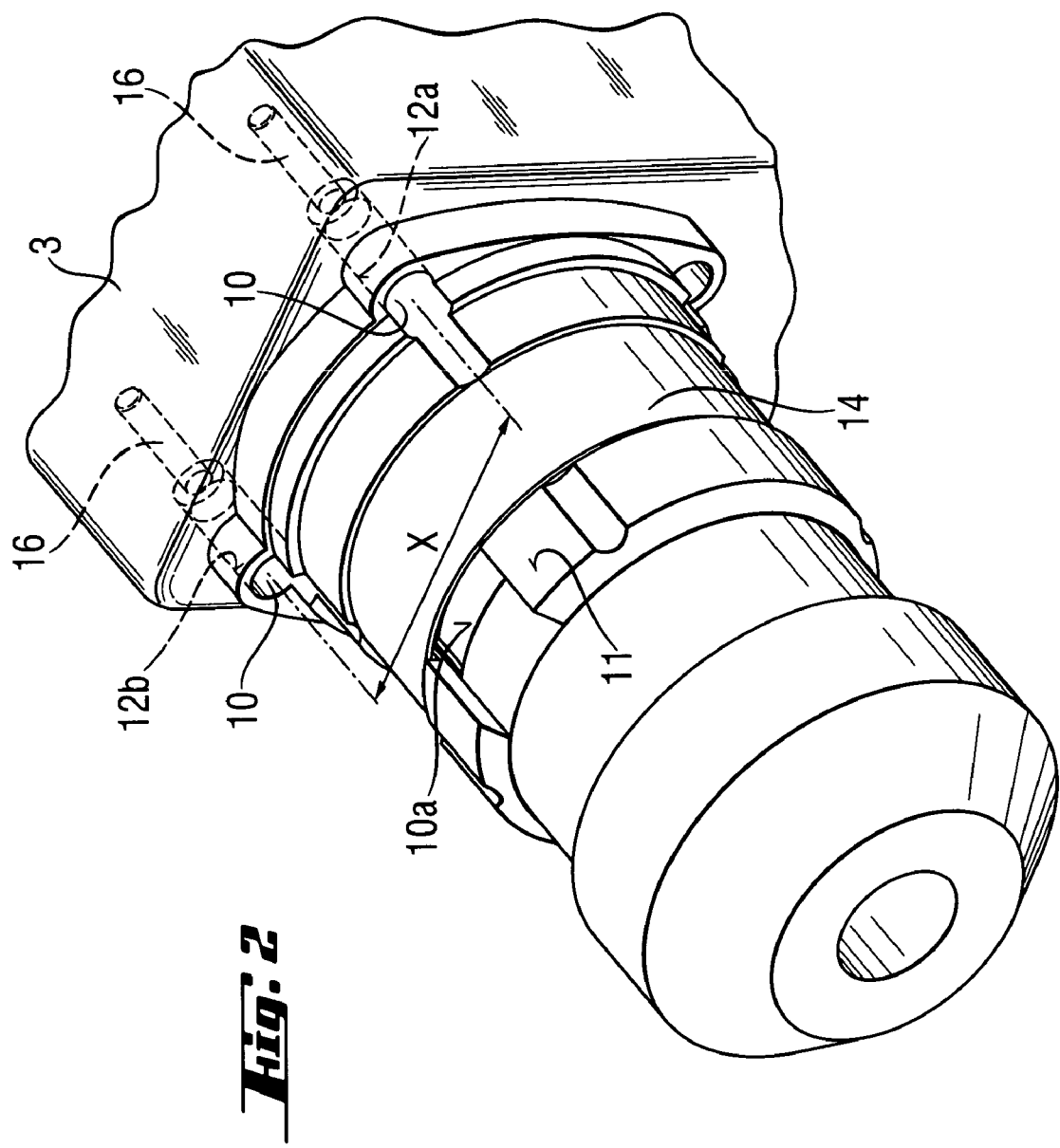
FIG. 2 a perspective view showing, at an increased scale, an attachment region of the power tool with the attachment element secured to the tool.

FIGS. 1–2 show an attachment element 1 according to the present invention for securing a depth stop 2 on a housing 3 of a hand-held power tool 4. The attachment element 1 has a pin guide 5 through which a depth stop 2 can extend, a securing element 6 formed as a wing bolt, a radial mounting surface 7 formed as an inner cylindrical surface, two projecting noses 8a, 8b provided on the power tool side of the pin guide 5 and an axially offset with respect to the noses 8a, 8b, projecting radially inward flange attachment nose 9 provided on the working tool side of the pin guide 5. The axially projecting noses 8a, 8b, and the flange attachment, nose 9 formlockingly engage in matching openings 10 and an axially offset opening 10a formed in a cylindrical flange 11, which is mountable on the hand-held power tool, for mounting the attachment element 1 on the power tool 4. Alternatively, the openings 10, 10a can be formed in the power tool 4 itself.

The two projecting noses 8a, 8b form, respectively, two holes 12a, 12b for receiving the heads of two deep-seated screws 16 for internally securing the cylindrical mountable flange 11 on the power tool 4. The two holes are spaced from each other by a distance X. The flange attachment nose 9 engages in the opening 10a of the mountable flange 11 in such a way that the attachment element 1 becomes axially fixed. The attachment nose 9 has an undercut 13 which is engaged from behind by a clamping band 14 of an auxiliary handle 15.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed:

1. An attachment element for securing a depth stop (2) of a hand-held power tool (4), comprising a pin guide (5); a fastening member (6); at least one securing nose (8a, 8b) and at least one flange attachment nose (9) axially offset with respect to the at least one securing nose (8a, 8b), the at least one securing nose (8a, 8b) and the at least one flange attachment nose (9) formlockingly engaging in respective openings (10, 10a) provided on the power tool (4) for securing the attachment element on the power tool (4); radially extending mounting surface (7) formed as an inner cylindrical surface; and another nose (8a, 8b) for securing the attachment element (1) to the power tool (4), the at least one securing nose (8a) and another securing nose (8b) forming two respective screw head holes (12a, 12b) for two deep-seated screws (16) for internally securing a cylindrical mounting flange (11) to the power tool (4).

2. An attachment element according to claim 1, wherein the at least one nose (8a, 8b) is formed as an axial projection provided on a power tool side of the attachment element (1).

3. An attachment element according to claim 1, wherein the at least one and another securing noses (8a, 8b) and, thereby, the two screw head holes (12a, 12b) are spaced from each other by a predetermined distance (X).

4. An attachment element according to claim 1, wherein the at least one flange attachment nose (9) is formed as a radially inwardly extending projection and is provided on a working tool side of the attachment element (1).

5. An attachment element according to claim 1, wherein the fastening member (6) is formed as a wing bolt.

6. An attachment element for securing a depth stop (2) of a hand-held power tool (4), comprising a pin guide (5); a fastening member (6); at least one securing nose (8a, 8b) and at least one flange attachment nose (9) axially offset with respect to the at least one securing nose (8a, 8b) the at least one securing nose (8a, 8b) and the at least one flange attachment nose (9) formlockingly engaging in respective openings (10, 10a) provided on the power tool (4) for securing the attachment element on the power tool (4); and radially extending mounting surface (7) formed as an inner cylindrical surface, wherein the flange attachment nose (9) has a radial under cut (13) to be engaged by a clamp band.

* * * * *